United States Patent
Kunihiro et al.

(10) Patent No.: US 8,724,129 B2
(45) Date of Patent: May 13, 2014

(54) IMAGE FORMING APPARATUS, SYSTEM FOR ORDERING OPTIONAL DEVICE, AND METHOD FOR ORDERING OPTIONAL DEVICE

(75) Inventors: Hisashi Kunihiro, Osaka (JP); Yasuyuki Ishiguro, Osaka (JP); Hitoshi Nagahama, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 70 days.

(21) Appl. No.: 13/332,860

(22) Filed: Dec. 21, 2011

(65) Prior Publication Data

US 2012/0162683 A1 Jun. 28, 2012

(30) Foreign Application Priority Data

Dec. 24, 2010 (JP) ................. 2010-288813

(51) Int. Cl.
- *G06F 3/12* (2006.01)
- *G06K 15/00* (2006.01)
- *G03G 5/00* (2006.01)
- *H04N 1/00* (2006.01)

(52) U.S. Cl.
USPC ........ 358/1.13; 358/1.16; 358/1.18; 358/1.15

(58) Field of Classification Search
USPC .................. 358/1.1–1.9, 1.11–1.18
See application file for complete search history.

(56) References Cited

U.S. PATENT DOCUMENTS

2009/0314837 A1 * 12/2009 Kataoka et al. ............... 235/385

FOREIGN PATENT DOCUMENTS

| JP | 2002-006696 |   | 1/2002 |
| JP | 2004-086414 |   | 3/2004 |
| JP | 2007-166057 | * | 6/2007 |

* cited by examiner

*Primary Examiner* — King Poon
*Assistant Examiner* — Ibrahim Siddo
(74) *Attorney, Agent, or Firm* — Nixon & Vanderhye P.C.

(57) ABSTRACT

The image forming apparatus of the present invention includes an image forming main device which has a control section. The control section (a) obtains, from an external device via a communication device, option information indicative of an at least one optional device and eco-information indicative of an amount of greenhouse-gas emitted due to the at least one optional device, (b) controls a display device to display the option information and the eco-information, and (c) sends, to the external device via the communication device, an order for an optional device selected by a user via the input device out of the at least one optional device indicated by the option information displayed on the display device.

6 Claims, 10 Drawing Sheets

○ IMAGE FORMING APPARATUS NEW PRODUCTS LIST

NOTE) $CO_2$ EMISSION AMOUNT (CONVERTED AMOUNT) ON CARBON FOOTPRINT LABEL INDICATES AMOUNT DUE TO DISPLAYED SYSTEM CONFIGURATION.

○ MONOCHROME MULTIFUNCTION PERIPHERAL

20t $CO_2$

15t $CO_2$

...

○ FULL-COLOR MULTIFUNCTION PERIPHERAL

10t $CO_2$

9t $CO_2$

...

503

IMAGE FORMING APPARATUS, SYSTEM FOR ORDERING OPTIONAL DEVICE, AND METHOD FOR ORDERING OPTIONAL DEVICE

This Nonprovisional application Claims priority under 35 U.S.C. §119(a) on Patent Application No. 2010-288813 filed in Japan on Dec. 24, 2010, the entire contents of which are hereby incorporated by reference.

TECHNICAL FIELD

The present invention relates to (i) an image forming apparatus including an image forming main device to which an optional device is connected, (ii) a system for ordering the optional device, and (iii) a method for ordering the optional device.

BACKGROUND ART

In recent years, a system has been proposed in which an order for optional equipment, which is connectable to an image forming apparatus, is sent to a management server via a network. For example, Patent Literature 1 discloses a configuration in which (i) an image processing apparatus, which is used by a user, is connected with a customer management server of a service center via a network, and (ii) an order for optional equipment, which is connectable to the image processing apparatus, is sent from the image processing apparatus to the customer management server via the network.

Specifically, when information regarding new products is updated, the customer management server notifies the image processing apparatus, which are managed by the customer management server, of the updated information. When the image processing apparatus receives the updated information regarding new products from the customer management server, the image processing apparatus checks its equipment information. In a case where the updated information regarding new products includes any product not equipped by the image processing apparatus, the image processing apparatus notifies the user of such a product which is not equipped by the image processing apparatus. Subsequently, when the user (i) selects a desired product from a list of the new products indicated by the updated information regarding new products and (ii) operates an order button, the image processing apparatus sends order information to the customer management server.

This configuration allows the user to know only information regarding products, which are not equipped by the subject image processing apparatus and are relating to and necessary to the subject image processing apparatus, out of information regarding latest optional products for the subject image processing apparatus and latest application products installable in the subject image processing apparatus. Moreover, the user can easily order, by using the image processing apparatus, a desired optional product selected from the information regarding optional products which are necessary for the subject image processing apparatus.

CITATION LIST

Patent Literature

Patent Literature 1

Japanese Patent Application Publication Tokukai No. 2007-166057 A (Publication date: Jun. 28, 2007)

SUMMARY OF INVENTION

Technical Problem

Meanwhile, in recent years, global warming has become a serious problem, and accordingly every country is demanded to suppress emissions of greenhouse-gases. Under the circumstances, users of image forming apparatuses are getting interested in the use of an image forming apparatus which can suppress emission of greenhouse-gas, in view of environmental consciousness.

According to the configuration disclosed in Patent Literature 1, the user can send an order for a desired optional product from the image processing apparatus to the customer management server via the network. However, when the user orders an optional product, etc., the image processing apparatus does not provide, to the user, information regarding greenhouse-gas emission. Therefore, even if the user has high environmental consciousness, the user cannot easily know, at the time of ordering optional products, etc., about environmental effects caused by the use of such optional products, etc. That is, the user cannot easily order an environmentally friendly product.

The present invention is accomplished in view of the problem, and an object of the present invention is to provide (i) an image forming apparatus with which a user can easily order an environmentally friendly optional device, which is connectable to the image forming apparatus, while checking an amount of greenhouse-gas emitted due to the optional device, (ii) a system for ordering the optional device, and (iii) a method for ordering the optional device.

Solution to Problem

In order to attain the object, an image forming apparatus of the present invention includes: an image forming main device to which at least one optional device is connectable, the image forming main device including: an image forming section, a display device, an input device, a communication device for communicating with an external device, and a control section, the control section being configured to (a) obtain option information and eco-information from the external device via the communication device, the option information being indicative of the at least one optional device and the eco-information being indicative of an amount of greenhouse-gas which is to be emitted and/or has been emitted due to the at least one optional device, (b) control the display device to display the option information and the eco-information, and (c) send, to the external device or another external device via the communication device, an order for an optional device which has been selected by a user via the input device out of the at least one optional device indicated by the option information displayed on the display device.

A method of the present invention for ordering an optional device for an image forming apparatus which includes an image forming main device to which at least one optional device is connectable, the image forming main device including (i) an image forming section, (ii) a display device, (iii) an input device, (iv) a communication device for communicating with an external device, and (v) a control section, the method including the steps of: the control section obtaining option information and eco-information from the external device via the communication device, the option information being indicative of the at least one optional device and the eco-information being indicative of an amount of greenhouse-gas which is to be emitted and/or has been emitted due to the at least one optional device; the control section controlling the display device to display the option information and the eco-information; and the control section sending, to the external device or another external device via the communication device, an order for an optional device which has been selected by a user via the input device out of the at least one optional device indicated by the option information displayed on the display device.

According to the configuration, the control section of the image forming main device (i) obtains, from the external device via the communication device, the option information indicative of the at least one optional devices and the eco-information indicative of the amount of greenhouse-gas which is to be emitted and/or has been emitted due to the optional devices and (ii) controls the display device to display the option information and the eco-information. Moreover, the control section sends, to the external device or another external device via the communication device, an order for an optional device selected by the user via the input device out of the at least one optional device indicated by the option information which is displayed on the display device.

With the configuration, in a case where the user selects and orders a desired optional device by operating the input device out of optional devices displayed on the display device, the user can easily select and order an environmentally friendly optional device while checking amounts of greenhouse-gases which are to be emitted and/or have been emitted due to the optional devices displayed on the display device.

Advantageous Effects of Invention

According to the configuration of the present invention, the user selects and orders a desired optional device by operating the input device out of optional devices displayed on the display device. In this case, the user can easily select and order an environmentally friendly optional device while checking amounts of greenhouse-gases which are to be emitted and/or have been emitted due to the optional devices displayed on the display device.

Figure 4:
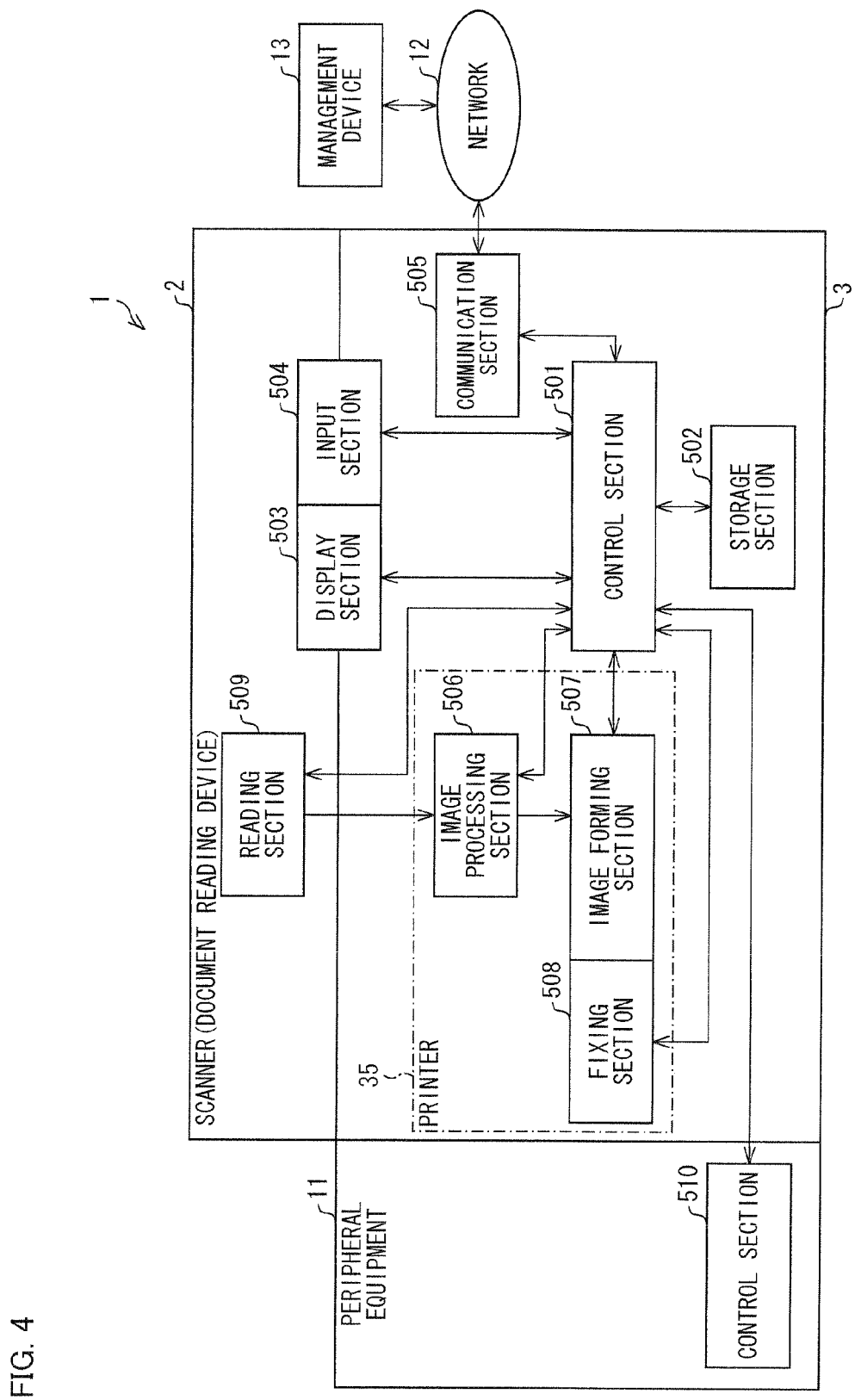
FIG. 4 is a block diagram illustrating a configuration of a system for ordering an optional device which is connectable to the image forming apparatus shown in FIG. 1.
Figure 5:
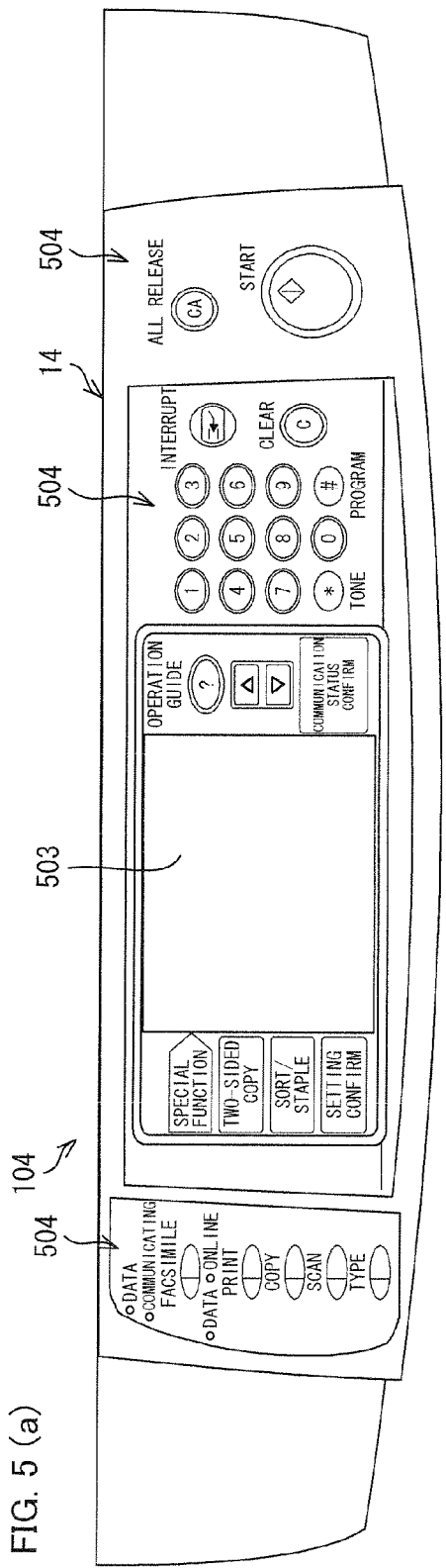
Figure 5:
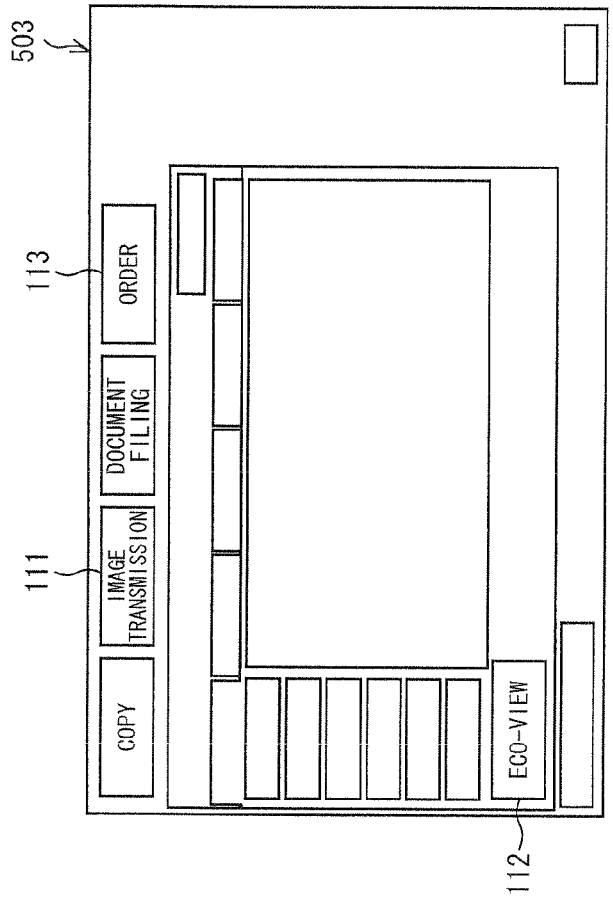

(a) of FIG. 5 is a front view of an operation panel of the image forming main device which operation panel has a display section and an input section shown in FIG. 4.

(b) of FIG. 5 is an explanatory view illustrating an initial screen (i) which is to be displayed on the display section shown in (a) of FIG. 5 and (ii) from which an instruction on image transmission is entered.

Figure 6:
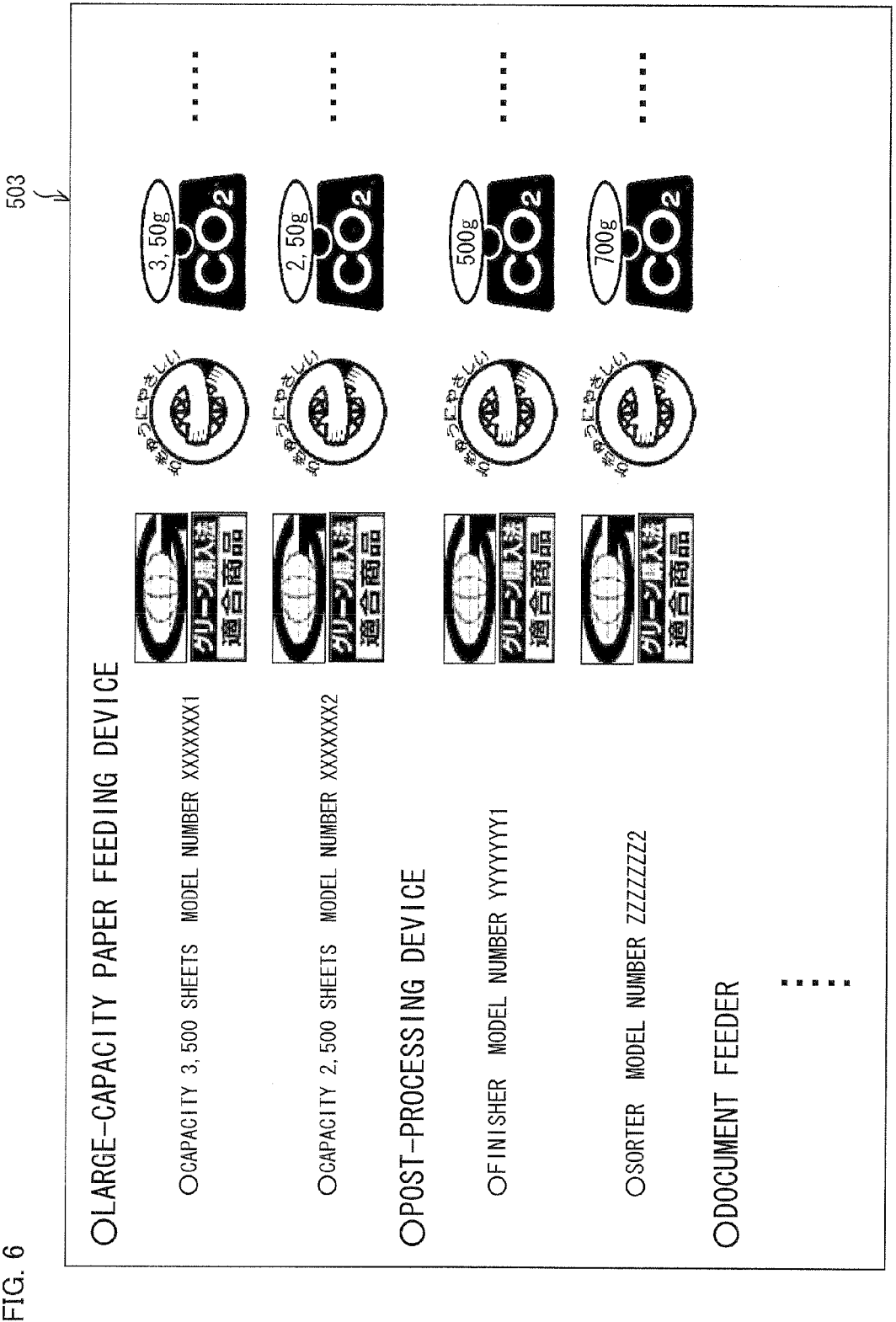

FIG. 6 is an explanatory view illustrating an eco-view screen displayed on the display section when an eco-view icon shown in (b) of FIG. 5 is operated.

Figure 7:
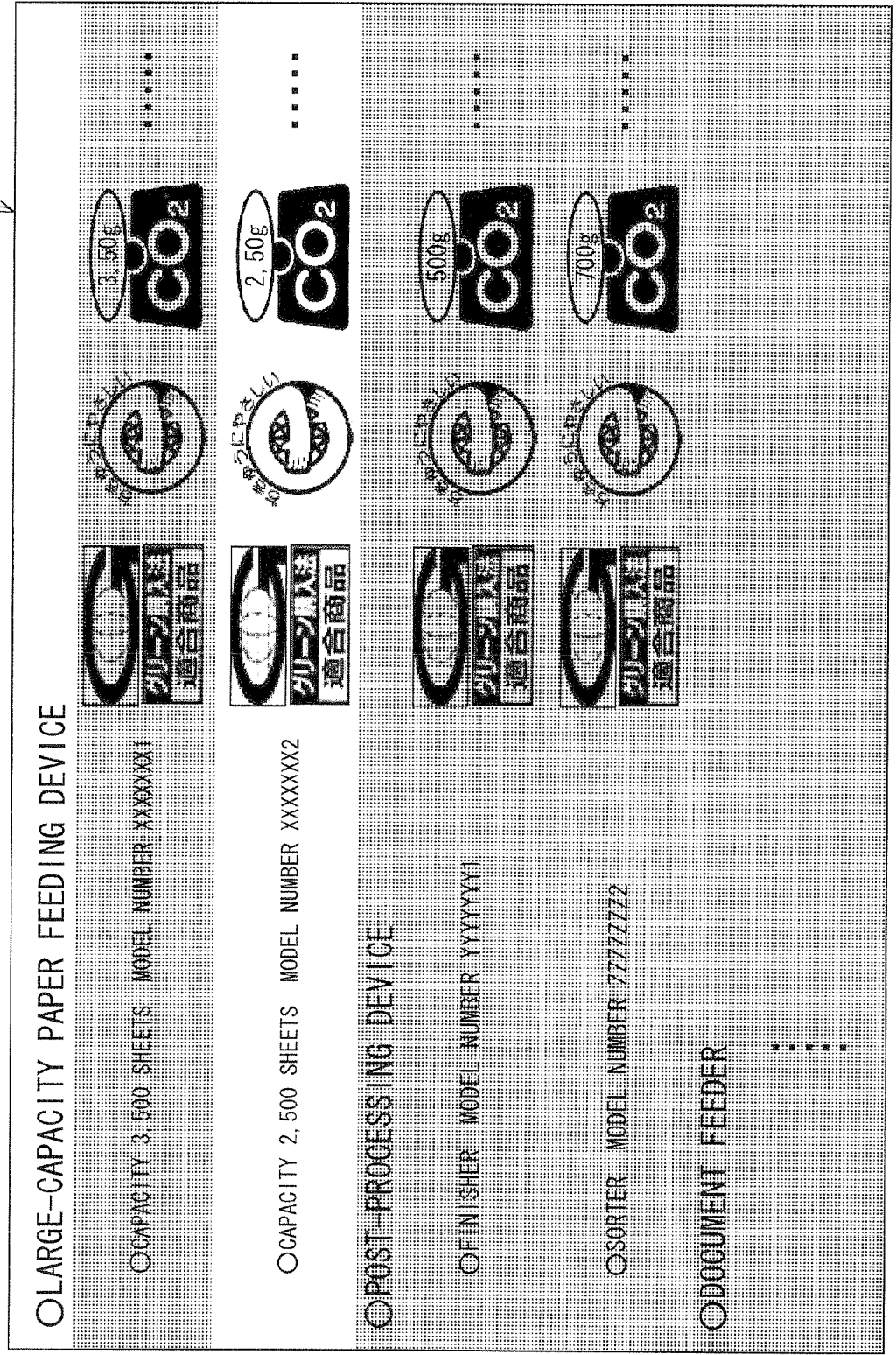

FIG. 7 is an explanatory view illustrating a screen displayed on the display section in which a large-capacity paper feeding device, which has capacity of 2500 sheets, is selected on the screen shown in FIG. 6.

Figure 8:
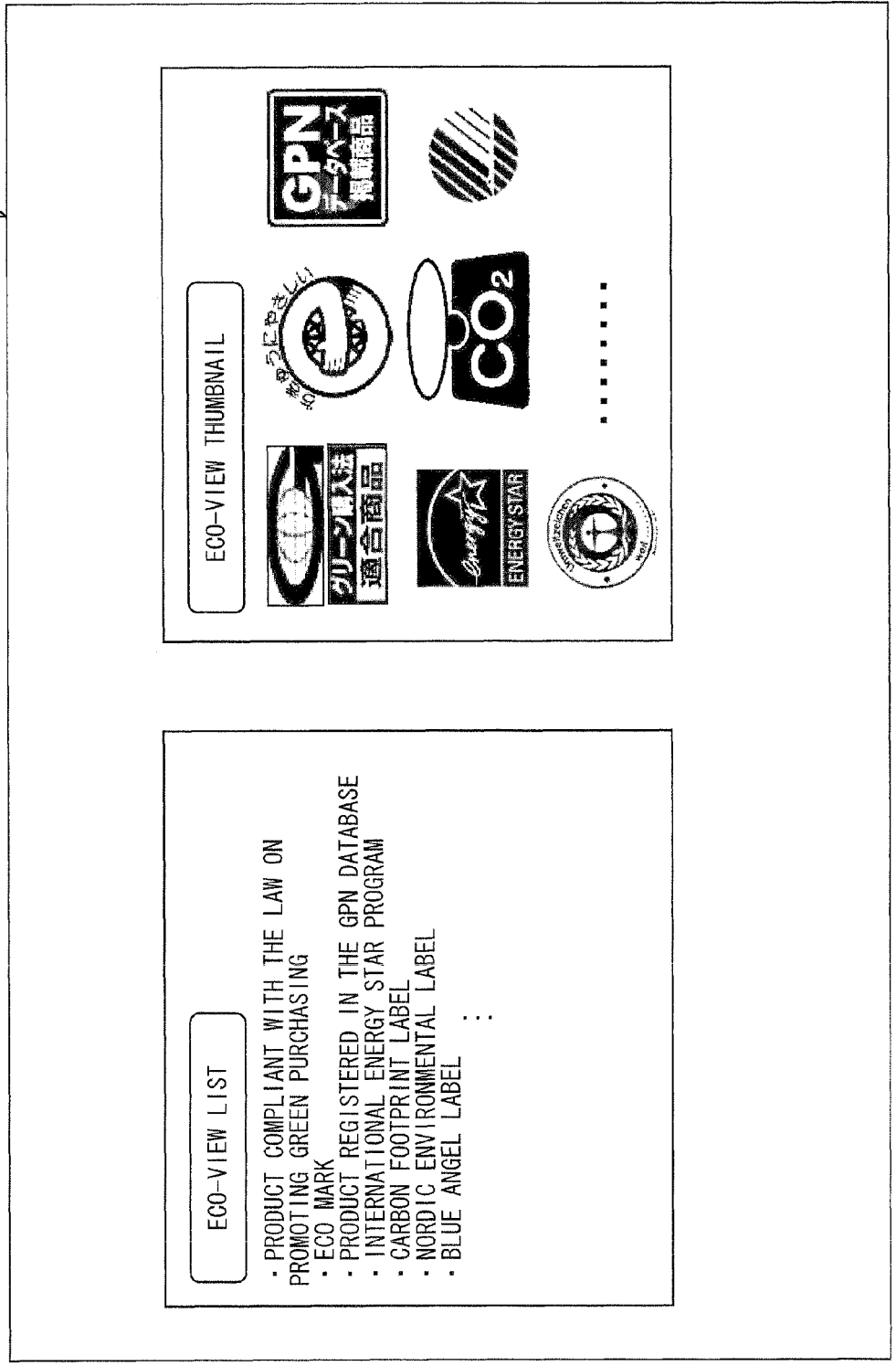

FIG. 8 is an explanatory view illustrating a screen displayed on the display section of the operation panel shown in (a) of FIG. 5, where the screen shows a list of pieces of eco-view information and thumbnail images of the pieces of eco-view information.

Figure 9:
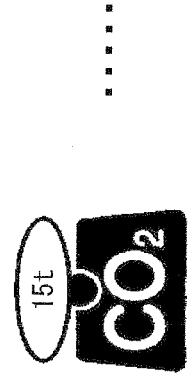
Figure 9:
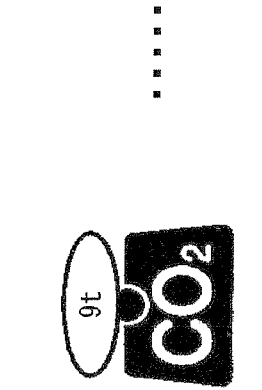
Figure 9:
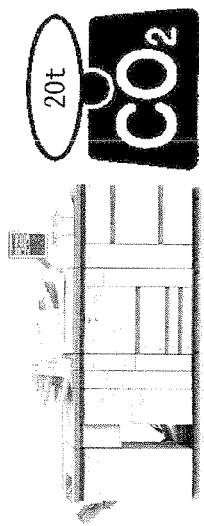
Figure 9:
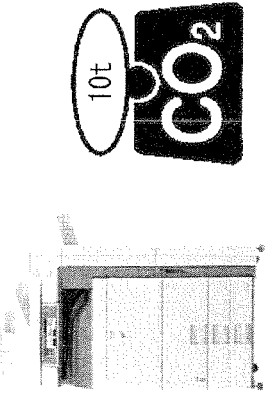

FIG. 9 is an explanatory view illustrating a screen displayed on the display section of the operation panel shown in (a) of FIG. 5, where the screen shows (i) new product information of image forming apparatuses and (ii) amounts of $CO_2$ (i.e., converted amount of greenhouse-gas) which are to be emitted and/or have been emitted by the respective image forming apparatuses.

Figure 1:
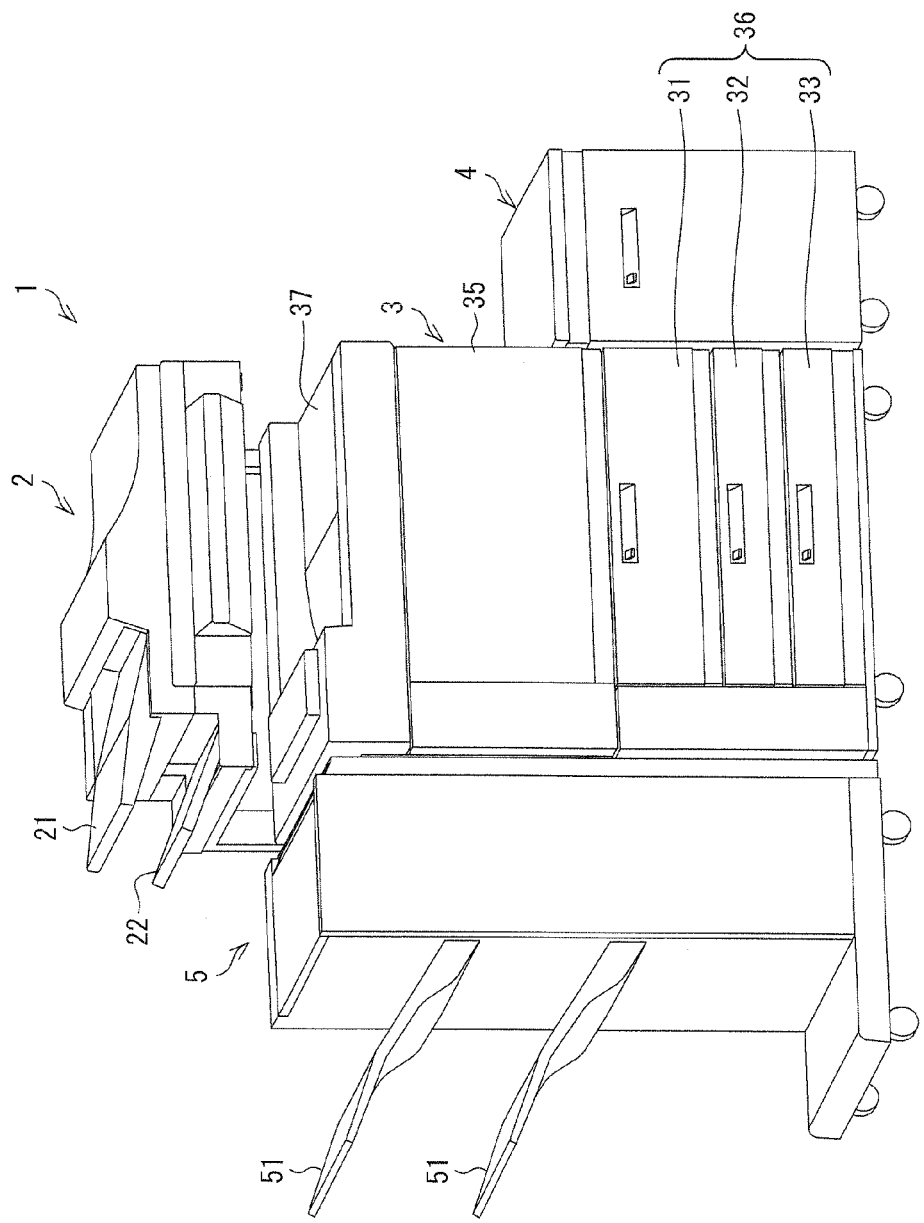
FIG. 1 is a perspective view illustrating an image forming apparatus in accordance with an embodiment of the present invention.
Figure 10:
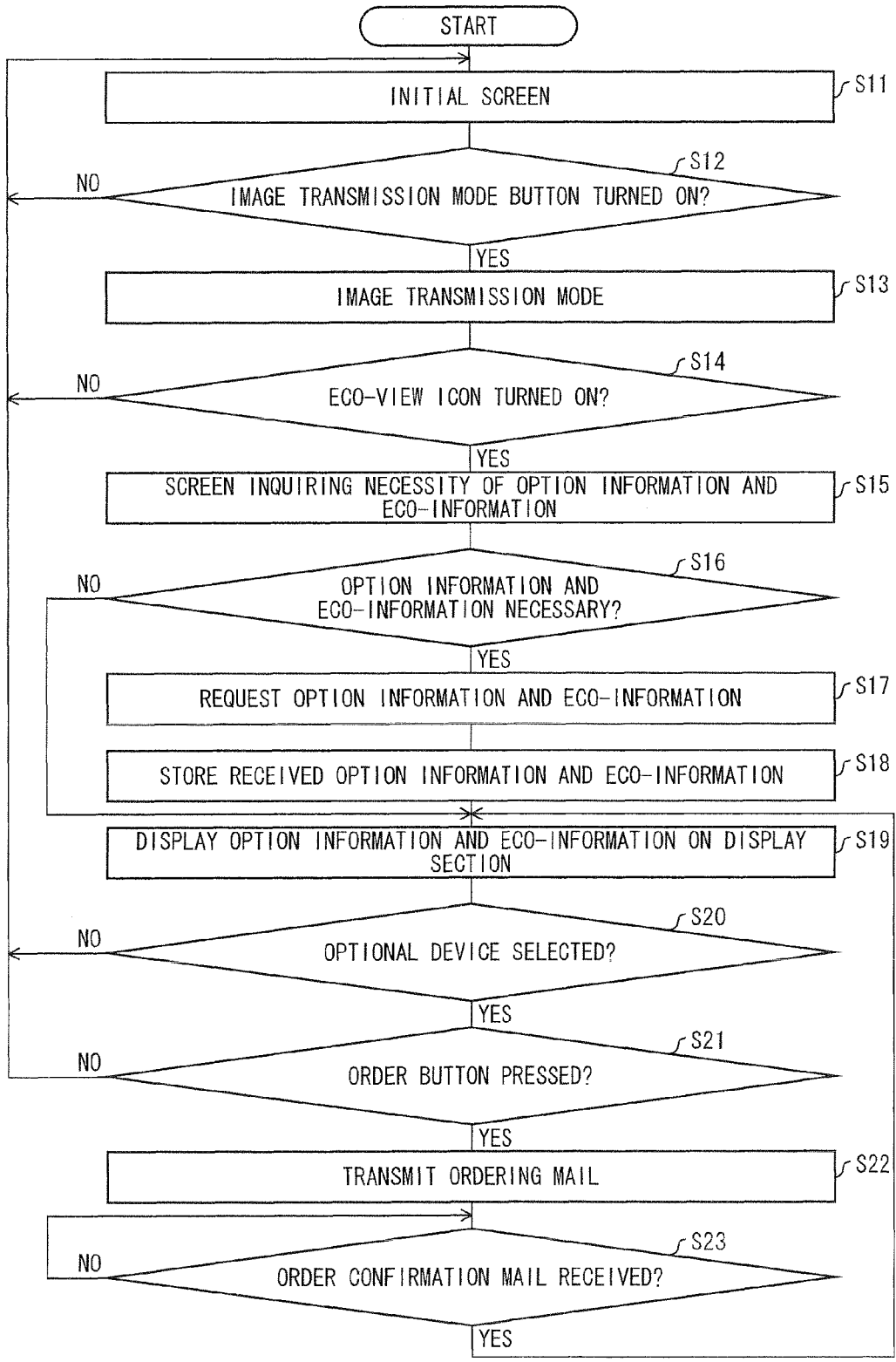

FIG. 10 is a flowchart illustrating a process of sending an order for an optional device from the image forming main device shown in FIG. 1.

DESCRIPTION OF EMBODIMENTS

The following describes an embodiment of the present invention with reference to drawings. FIG. 1 is a perspective view illustrating an image forming apparatus in accordance with an embodiment of the present invention.

An image forming apparatus 1 of the present embodiment includes a document reading device 2, an image forming main device 3, a large-capacity paper feeding device 4, and a post-processing device 5 (see FIG. 1) The document reading device 2, the large-capacity paper feeding device 4, and the post-processing device 5 serve as optional devices for the image forming main device 3.

The image forming main device 3 includes a printer 35 and a paper feeder 36. The printer 35 carries out printing on a sheet based on image data. Specifically, the printer 35 forms, based on the inputted image data, a visible toner image on a sheet supplied from the paper feeder 36.

The paper feeder 36 has three paper cassettes 31 through 33 which are vertically aligned. The paper cassettes 31 through 33 (i) are capable of containing respective different sizes of paper and (ii) each supply the stored paper to the printer 35.

The document reading device 2 is disposed above the image forming main device 3. The document reading device 2 (i) obtains image data of a plurality of documents by sequentially carrying and reading the plurality of documents placed on a document placing tray 21, and then (ii) sends the obtained image data to the image forming main device 3. Moreover, the document reading device 2 discharges the documents, which have been read, to a paper output tray 22.

Figure 2:
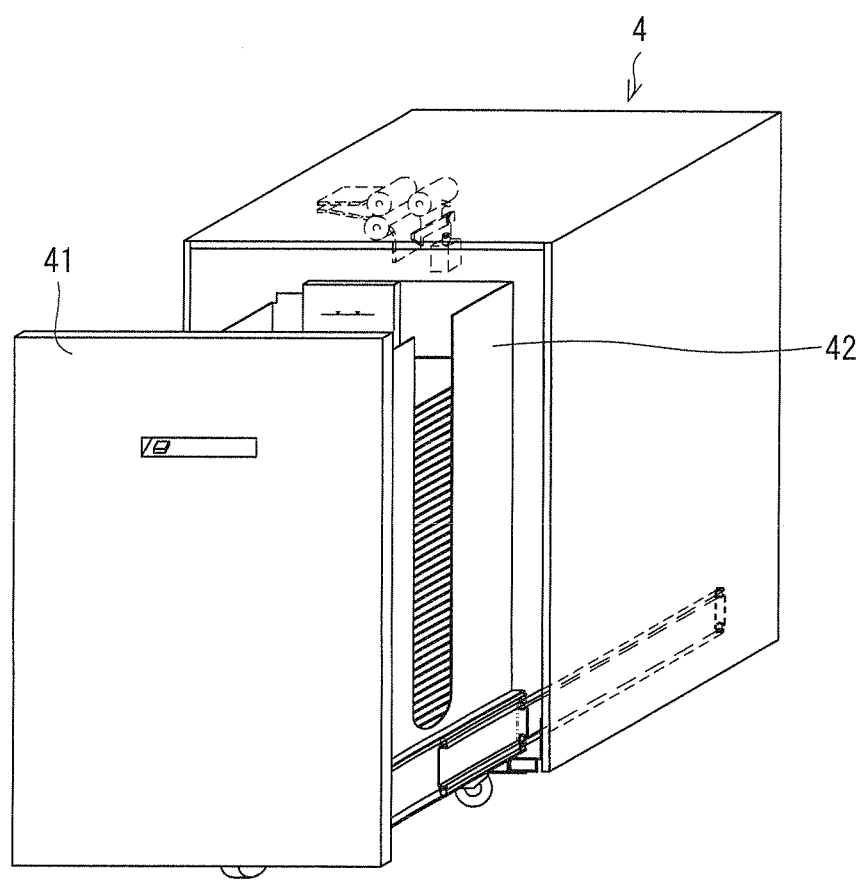
FIG. 2 is a perspective view illustrating a large-capacity paper feeding device shown in FIG. 1, where a front door is opened so that a sheet-containing section is drawn out.

The large-capacity paper feeding device 4 is capable of containing large amounts of particular sized paper (e.g., A4-size paper). The large-capacity paper feeding device 4 supplies, in response to an instruction from the image forming main device 3, the contained paper to the printer 35 of the image forming main device 3. FIG. 2 is a perspective view illustrating the large-capacity paper feeding device 4, where a front door 41 is opened so that a sheet-containing section 42 is drawn out. In the large-capacity paper feeding device 4, the sheet-containing section 42 is drawn out so that paper is loaded into the sheet-containing section 42 (see FIG. 2).

Figure 3:
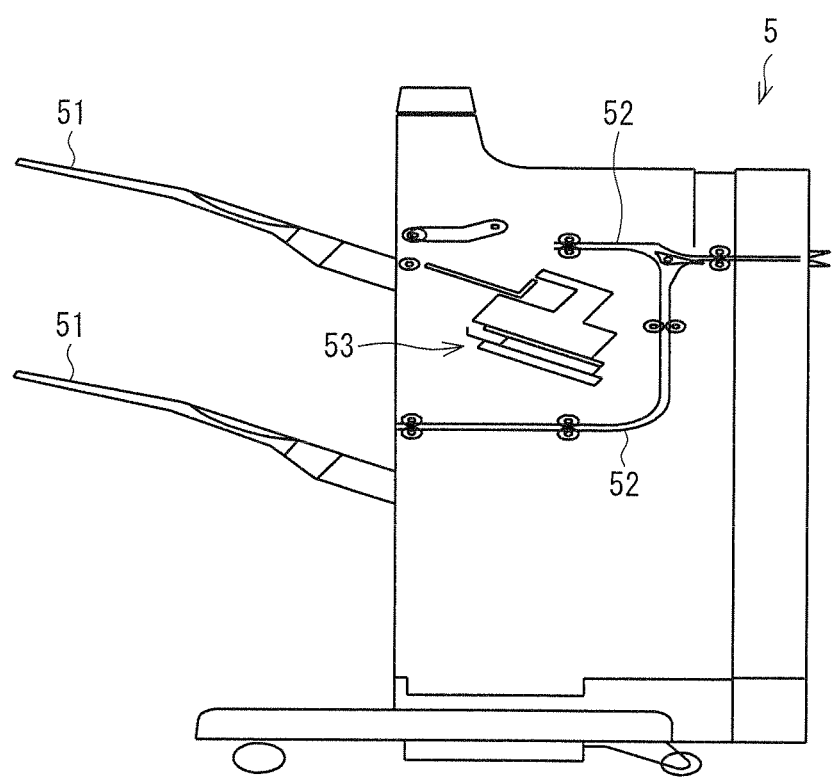
FIG. 3 is a longitudinal sectional view schematically illustrating a structure of a post-processing device shown in FIG. 1.

The post-processing device 5 carries out a post-process such as stapling or punching on the sheet on which an image has been printed by the printer 35 and which has been discharged from the image forming main device 3. The post-processing device 5 has (i) a plurality of paper output trays 51, (ii) a plurality of branched carrying paths 52 each of which carries a sheet to a corresponding one of the plurality of paper output trays 51, and (iii) a post-processing section 53 which is provided on any of the plurality of branched carrying paths 52 and carries out a post-process (see FIG. 3). Note that FIG. 3 is a longitudinal sectional view schematically illustrating a structure of the post-processing device 5.

The following describes a functional configuration of the image forming apparatus 1. FIG. 4 is a block diagram illustrating a configuration of a system for ordering an optional device connectable to the image forming apparatus 1 shown in FIG. 1.

The image forming apparatus 1 includes the image forming main device 3, the document reading device 2, and peripheral equipment 11 (see FIG. 4). The "peripheral equipment 11" is a collective term for the optional devices connectable to the image forming main device 3, except for the document reading device 2.

The image forming main device 3 includes a control section 501, a storage section 502, a display section (display device) 503, an input section (input device) 504, a communication section (communication device) 505, an image processing section 506, an image forming section 507, and a fixing section 508. The document reading device 2 includes a reading section 509. The peripheral equipment 11 includes a control section 510.

The control section 501 controls an operation of the entire image forming apparatus 1. The storage section 502 stores various kinds of information necessary for the control section 501 to control the image forming apparatus 1. The display section 503 corresponds to a display section of an operation panel provided in the image forming main device 3. The input section 504 is made up of various kinds of keys and an input section on the operation panel. The communication section 505 is used when the image forming main device 3 communicates with an external device, e.g., a management device (an external device, an information-providing external device) 13, via a network 12.

The image processing section 506, the image forming section 507, and the fixing section 508 constitute the printer 35. The image processing section 506 carries out an image processing, for printing, on image data of document which has been obtained by and supplied from the reading section 509 of the document reading device 2. The image forming section 507 forms, on a sheet, a toner image based on the image data sent from the image processing section 506. The fixing section 508 fuses and fixes the toner image, which has been formed by the image forming section 507, on the sheet.

Note that the sheet, on which the toner image has been fixed by the fixing section 508, is (i) discharged on a paper output tray 37 provided on an upper face of the image forming main device 3 or (ii) discharged, via the post-processing device 5, on the paper output tray 51 of the post-processing device 5.

The reading section 509 of the document reading device 2 includes a CCD sensor and sends image data, which has been read, to the image processing section 506. The peripheral equipment 11 includes the control section 510. The control section 510 communicates with the control section 501 of the image forming main device 3 so as to control operation of the peripheral equipment 11.

(a) and (b) of FIG. 5 illustrate an operation panel 14 which has the display section 503 and the input section 504 shown in FIG. 4. (a) of FIG. 5 is a front view of the operation panel 14 of the image forming main device 3 which operation panel 14 has the display section 503 and the input section 504 shown in FIG. 4. (b) of FIG. 5 is an explanatory view illustrating an initial screen (i) which is displayed on the display section 503 shown in (a) of FIG. 5 and (ii) from which an instruction on image transmission is entered.

According to the image forming main device 3 of the present embodiment, an order for an optional device connectable to the image forming main device 3 can be sent to the management device 13 in response to an instruction entered by the user from the input section 504. The management device 13 is managed by a manufacturer, a dealer, a distributor, a leasing company, or the like, of the image forming apparatus. Alternatively, the management device 13 may be managed by a cloud provider, which will be described later.

When an order for an optional device is sent to the management device 13, the control section 501 requests, in response to an instruction entered by the user from the input section 504, the management device 13 to send option information and eco-information regarding optional devices. This request may be sent via, for example, e-mail (request mail). A mail address of the management device 13 is stored in the image forming main device 3 in advance so that the request for option information and eco-information will be automatically transmitted to the mail address when the request is selected. Note that (i) a name and a model number of the image forming main device 3 or (ii) an address, a serial number, or the like, for identifying the image forming main device 3 will be automatically attached to the request mail.

The control section 501 (i) obtains the option information and the eco-information sent from the management device 13 in response to the request mail and then (ii) controls the storage section 502 to store the option information and the eco-information.

On the other hand, the management device 13, which has received the request mail from the image forming main device 3, sends, to the image forming main device 3, the option information and the eco-information for the image forming main device 3, based on the name and the model number of the image forming main device 3 or the information such as the address or the serial number for identifying the image forming main device 3. This sending of the option information and the eco-information may be automatically carried out by the management device 13 or may be manually carried out by a manager of the management device 13.

The image forming main device 3 and the management device 13 can communicate with each other via general wired or wireless communication means.

In a case where wired communication means is used, Ethernet (IEEE standard) can be employed. Specifically, it is possible to employ a standard such as 10BASE-T, 100BASE-TX, or 10GBASE-T; or a multimode optical standard thereof such as 10BASE-F, 100BASE-F, 1000BASE-X, 10GBASE-R, 10GBASE-W, or 10GBASE-X.

In a case where wireless communication means is used, WiMAX (IEEE standard) can be employed. Specifically, it is possible to employ IEEE 802.16 (broadband wireless standard), IEEE 802.16a (fixed wireless communication standard, modification of IEEE 802.16 in terms of used frequency band), or IEEE 802.16-2004 (a system used in a fixed range, also known as IEEE 802.16a/REVd).

Alternatively, the image forming main device 3 and the management device 13 may communicate with each other via cloud computing in a cloud computing service provided by a cloud provider.

Here, the option information is product information which indicates existing optional devices connectable to the image forming main device 3. On the other hand, the eco-information relates to greenhouse-gases which are to be emitted and/or have been emitted due to the respective optional devices.

When an eco-view icon 112 is operated by the user in a state where the storage section 502 stores the option information and the eco-information, the control section 501 controls the display section 503 to display the option information and the eco-information. FIG. 6 is an explanatory view illustrating an eco-view screen displayed on the display section 503 when the eco-view icon 112 is operated by the user.

In the eco-view screen illustrated in FIG. 6, for example, the option information is shown in a left side area of the screen, and the eco-information is shown in a right side area of the screen, when viewed by the user. The option information indicates optional devices connectable to the image forming main device 3. The eco-information, which is displayed together with the optional devices, includes pieces of eco-information associated with the optional devices. The eco-information is information relating to environmental friendliness, which information has been granted to the optional devices.

Specifically, the option information indicates, for example, (i) as the large-capacity paper feeding device 4, a paper feeding device having capacity of 3500 sheets and a paper feeding device having capacity of 2500 sheets and, (ii) as the post-processing device 5, a finisher and a sorter. For example, the eco-information indicates, from the left, (i) that a subject product conforms to Law on Promoting Green Purchasing (in the label, the middle part reads "Law on Promoting Green Purchasing" and the lower part reads "Conforming Product", in Japanese), (ii) that the subject product conforms to Eco Mark (registered trademark) (the upper part of the mark reads "Earth-friendly" in Japanese), and (iii) a carbon footprint label. In the present embodiment, thumbnail images of eco-labels are displayed as the eco-information.

The label indicative of conformity to the Law on Promoting Green Purchasing relates to green purchasing promoted nationwide or locally by the Ministry of the Environment.

Eco Mark is in conformity with the ISO Standard (ISO14024) and is to be accredited by the Japan Environment Association. Eco Mark indicates a type and an amount of greenhouse-gas emitted in a whole life cycle of a subject product. Specifically, Eco Mark is indicative of information regarding the subject product, i.e., a type and an amount of greenhouse-gas which is emitted in a raw material procuring phase, in a manufacturing phase, in a distributing phase, in a using and maintaining phase, and in a discarding or recycling phase.

The carbon footprint label indicates, in terms of $CO_2$ (carbon dioxide), an amount of greenhouse-gas emitted in a whole life cycle of a subject product.

The greenhouse-gas is classified into six types, i.e., $CO_2$, $CH_4$, $N_2O$, HFCs, PFCs, and $SF_6$, which are subjected to the Kyoto Protocol. However, emission amounts of these types of greenhouse-gases are recorded on the label in terms of $CO_2$ (carbon dioxide). Therefore, the thumbnail image of the carbon footprint label shows an amount of $CO_2$, which is a converted amount of greenhouse-gas emitted due to an optional device.

A $CO_2$ emission amount is calculated based on the following Equation (1), by utilizing the LCA (life cycle assessment) method.

$$CO_2 \text{ emission amount} = \Sigma(\text{amount } i \text{ of activity} \times CO_2 \text{ emissions intensity}) \quad (1)$$

where i is indicative of an amount of activity (process) from the raw material procuring phase through the discarding or recycling phase.

The amount of activity in each phase of the life cycle is defined as the following (A) through (E):

(A) An amount of activity in the raw material procuring phase is defined as an amount of materials used.

(B) An amount of activity in the manufacturing phase is defined as assembly weight and electric power consumption in manufacturing.

(C) An amount of activity in the distributing phase is defined as traffic volume (the product of a transportation distance, a loading ratio, and a truckload quantity)

(D) An amount of activity in the using and maintaining phase is defined as electric power consumption in using.

(E) An amount of activity in the discarding or recycling phase is defined as landfill weight and recycling weight.

Note that, in the present embodiment, the $CO_2$ emission amount is indicated in grams (g). Therefore, the label (i) is designated by letters "$CO_2$" and (ii) indicates a $CO_2$ emission amount in grams (g). Note that the unit in which the $CO_2$ emission amounts are expressed is not limited to grams. Instead of grams, $CO_2$ emission amounts may be expressed in kilograms (kg) or in tons (t).

In a case where any of the optional devices displayed in the screen illustrated in FIG. 6 is selected by the user from the operation panel 14, the selected optional device and eco-information associated with the selected optional device are indicated in black (see FIG. 7). On the other hand, the other optional devices, i.e., non-selected optional devices, and eco-information associated with the non-selected optional devices are indicated in gray or are covered with gray. This allows the user to plainly see which optional device is selected or not selected. FIG. 7 illustrates a state where a large-capacity paper feeding device 4, which has capacity of 2500 sheets, has been selected on the screen illustrated in FIG. 6.

In a case where an order button 113 displayed on the display section 503 is operated by the user while any of the optional devices is being selected as described above, an order for the selected optional device is sent to the management device 13. In this case, the control section 501 prepares ordering mail in a predetermined form and controls the communication section 505 to send the ordering mail to the management device 13. Subsequently, when the ordering mail sent from the image forming apparatus 1 is checked by the management device 13 side (e.g., a manufacturer, a dealer, a distributor, or a leasing company which manages the management device 13), a predetermined process is carried out in response to acceptance of the order for the optional device.

Note that the manner of indicating selected or non-selected optional devices is not limited to the one described above. For example, a selected optional device may be indicated in a conspicuous color, may be blinked, or may be partially color-changed and/or blinked. Alternatively, the selected optional device can be indicated by changing color tone thereof and/or by changing sizes of characters and figures thereof, or the selected optional device can be indicated by being moved into an area which indicates that the moved optional device has been selected. With regard to the selection of the optional device, it is possible to further carry out a selection operation from the state illustrated in FIG. 7.

The image forming apparatus 1 may be configured such that the display section 503 displays (i) a list of pieces of eco-view information of the entire image forming apparatus 1 including the optional devices and (ii) thumbnail images of the pieces of eco-view information, when the user operates the eco-view icon 112 and the operation panel 14 so as to determine contents to be displayed.

FIG. 8 is an explanatory view illustrating a screen displayed on the display section 503 of the operation panel 14, where the screen shows a list of pieces of eco-view information and thumbnail images of the pieces of eco-view information.

An eco-view list area in the screen illustrated in FIG. 8 shows a list of the pieces of eco-view information, that is, information of conformity to Law on Promoting Green Purchasing, information of conformity to Eco Mark (registered trademark), information of registration in the GPN database, information of conformity to International Energy Star Program, information regarding the carbon footprint label, information of conformity to a Nordic Environmental Label, and information of conformity to a blue angel label. An eco-view thumbnail area in the screen illustrated in FIG. 8 shows thumbnail images of the pieces of eco-view information listed in the eco-view list area.

In the case where the screen illustrated in FIG. 8 is to be displayed, the image forming apparatus 1 requests the management device 13 to send (i) a list of pieces of eco-information of the entire image forming apparatus 1 including the optional devices and (ii) images or thumbnail images indicative of the pieces of eco-information. Subsequently, the image forming apparatus 1 obtains the requested information, and then stores the obtained information in the storage section 502. Note that the pieces of eco-view information, which are included in the list, are pieces of eco-information which have been granted to the image forming apparatus 1.

The image forming apparatus 1 may be configured such that, for example, the display section 503 displays (i) new product information of image forming apparatuses and (ii) $CO_2$ emission amounts thereof (see FIG. 9), when the user operates the eco-view icon 112 and the operation panel 14 so as to determine contents to be displayed.

FIG. 9 is an explanatory view illustrating a screen displayed on the display section 503 of the operation panel 14, where the screen shows (i) new product information of image forming apparatuses and (ii) amounts of $CO_2$ (i.e., converted amounts of greenhouse-gases) which are to be emitted and/or have been emitted by the respective image forming apparatuses.

In this case, new product information of image forming apparatuses is appropriately sent, for example, from the management device 13 to the image forming apparatus 1. Alternatively, the image forming apparatus 1 requests, as appropriate, the management device 13 to send new product information of image forming apparatuses to the image forming apparatus 1.

Each piece of the new product information is associated with a carbon footprint label indicative of a $CO_2$ emission amount. The control section 501 of the image forming apparatus 1 controls the storage section 502 to store the new product information received from the management device 13. Moreover, when an instruction on displaying the new product information is entered by the user from the operation panel 14, the control section 501 (i) reads out the new product information and the associated $CO_2$ emission amount from the storage section 502 and then (ii) controls the display section 503 to display the new product information and the associated $CO_2$ emission amount.

According to the configuration, the user can select a more environmentally friendly image forming apparatus by referring to the screen displayed on the display section 503. This allows the user to easily purchase the more environmentally friendly image forming apparatus so as to replace the currently using image forming apparatus with the new one. Alternatively, in a case where the user is leasing the image forming apparatus, the user can easily replace the leasing image forming apparatus with new one. Note that, in an operation for ordering a new image forming apparatus, the user selects a desired image forming apparatus from image forming apparatuses displayed on the display section 503, and then an order for the selected image forming apparatus is sent to the management device 13, as with the operation for ordering the optional device.

The following describes, with reference to FIG. 10, a process of sending an order for an optional device from the image forming main device 3 which is configured as above described. FIG. 10 is a flowchart illustrating a process of sending an order for an optional device from the image forming main device 3 shown in FIG. 1. Here, it is assumed that only the image forming main device 3 has already been purchased as the image forming apparatus 1. Moreover, it is also assumed that the user is planning to improve work efficiency by automating processes such as a punching process, by taking into consideration (i) increasing frequency in use of the image forming main device 3 and (ii) used amount of paper and the number of copies processed in the post-process.

When a power supply of the image forming main device 3 is turned on, the control section 501 controls the display section 503 of the operation panel 14 to display the initial screen (S11). When an image transmission mode button 111 (see (b) of FIG. 5) in the initial screen is pressed by the user (S12), the image forming main device 3 enters into an image transmission mode (S13). In this case, the display section 503 displays the screen illustrated in (b) of FIG. 5 in which the eco-view icon 112 is displayed at the lower left in the display section 503.

Subsequently, when the user touches, i.e., presses the eco-view icon 112 (S14), the control section 501 controls the display section 503 to display a screen displaying (i) information inquiring whether or not option information and eco-information are necessary and (ii) "YES" and "NO" so that the user can make a selection (S15). The information inquiring whether or not option information and eco-information are necessary is, for example, a message "Do you need option information and eco-information?".

Note that, in a case where the image transmission mode button 111 is not pressed in the step S12, the display section 503 keeps displaying the initial screen. Moreover, in A case where the eco-view icon 112 is not pressed within a predetermined period of time in the step S14, the display section 503 displays the initial screen of the step S11.

In a case where the "YES" in the step S15 is selected by the user (S16), the control section 501 requests, via the communication section 505, the management device 13 to send option information and eco-information (S17). Subsequently, in response to the request, the management device 13 sends the option information and the eco-information to the image forming main device 3, and then the control section 501 controls the storage section 502 to store the option information and the eco-information (S18). Note that, in a case where the user selects the "NO" in the step S16, the process proceeds to a step S19.

Next, the control section 501 reads out the option information and the eco-information from the storage section 502, and then controls the display section 503 to display the option information and the eco-information (S19). Note that, since the option information and the eco-information are once stored in the storage section 502 in the step S18, it is not necessary to obtain the option information and the eco-information again from the management device 13 when the option information and the eco-information are displayed on the display section 503 later. In the case where the "NO" is selected by the user in the step S16, option information and eco-information, which have been stored in the storage section 502 prior to the processes in the steps S17 and S18, are displayed in the step S19.

Next, in a case where (i) any of optional devices indicated by the option information displayed on the display section 503 in the step S19 is selected (S20) and (ii) the order button 113 displayed on the display section 503 is pressed (S21), the control section 501 sends, to the management device 13, ordering mail for ordering the optional device selected in the step S20 (S22).

Note that, in a case where no optional device is selected within a predetermined period of time in the step 20, the display section 503 displays the initial screen of the step 11. Alternatively, in a case where the order button 113 is not pressed within a predetermined period of time in the step S21, the display section 503 displays the initial screen of the step 11.

Next, when the control section 501 receives, from the management device 13, order confirmation mail indicating that the order has been confirmed (S23), the process returns to the step S19 in which the control section 501 controls the display section 503 to display the option information and the eco-information, and the processes in the step S19 and in the following steps are repeated. After that, when the power supply is turned off, the ordering operation is ended.

As described above, in the image forming apparatus 1 of the present embodiment, the option information and the eco-information are displayed on the display section 503 of the operation panel 14. With the configuration, the user can order a desired optional device while checking (i) optional devices indicated by the option information and (ii) eco-information of the optional devices, i.e., amounts of greenhouse-gases which are to be emitted and/or have been emitted due to the respective optional devices. This allows the user to easily order an environmentally friendly optional device.

Note that, in the embodiment described above, the management device (external device) 13, to which the order for the optional device is sent, is assumed to be the management device (external device) 13 which supplies the option information and the eco-information, for convenience of explanation. However, the present embodiment is not limited to this, and therefore these management devices 13 may be different devices.

Lastly, each block of the image forming apparatus 1, in particular, the control section 501 may be configured by hardware logic or realized by software with the use of CPU as follows.

That is, the image forming apparatus 1 includes a CPU (central processing unit), a ROM (read only memory), a RAM (random access memory), and a storage device (storage medium) such as a memory. The CPU executes instructions of control programs for realizing the functions of the image forming apparatus 1. In the ROM, the programs are stored. Into the RAM, the programs are loaded. In the storage device, the programs and various data are stored. The objective of the present invention can also be achieved, by (i) supplying a storage medium, in which program codes (executable programs, intermediate code programs, source programs) of programs for controlling the image forming apparatus 1, each being configured by software for realizing the functions, are stored so that a computer can read them, to the image forming apparatus 1, and then (ii) causing the computer (or CPU or MPU) to read and execute the program codes stored in the storage medium.

The storage medium can be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD, CD-R, or Blu-ray; a card such as an IC card (memory card) or an optical card; or a semiconductor memory such as a mask ROM, EPROM, EEPROM, or flash ROM.

Alternatively, the image forming apparatus 1 can be arranged to be connected to a communications network so that the program codes are delivered over the communications network. The communications network is not limited to a specific one, and therefore can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific one, and therefore can be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR, mobile telephone network, satellite line, or terrestrial digital network. Note that, the present invention can be realized by a computer data signal (i) which is realized by electronic transmission of the program code and (ii) which is embedded in a carrier wave.

The display device of the present invention can be a liquid crystal display, an organic EL display, a plasma display, a plasma tube array display, an electronic paper display utilizing electrophoresis, or an electron emission display.

The present invention is applicable to, for example, household appliances and commercial equipment which utilize a display device. Note that the "household appliances" refer to products or standardized products, such as electrical appliances or devices relating to video, audio, and communications, which are aimed to be used by general consumers at ordinary houses or which are developed and designed based on such premises. The "commercial equipment" refers to products developed for use in corporations (companies, schools, and public offices), etc. which are not ordinary houses.

In the image forming apparatus described above, the eco-information displayed on the display device may include a label indicative of the eco-information.

According to the configuration, the eco-information displayed on the display device includes the label indicative of the eco-information. This allows the user to easily know an environmentally friendly optional device by checking the displayed label, in a case where the user selects and orders a desired optional device by operating the input device. Therefore, the use can easily select and order the desired optional device.

In the image forming apparatus, the eco-information may include plural kinds of eco-information which are respectively authorized by different parties.

According to the configuration, the eco-information includes the plural kinds of eco-information which are respectively authorized by different parties. Accordingly, the display device displays the plural kinds of eco-information of each optional device. This allows the user to select an appropriate optional device by referring to the plural kinds of eco-information displayed on the display device, in a case where the user selects and orders a desired optional device by operating the input device.

An optional device ordering system for an image forming apparatus of the present invention includes: the image forming apparatus which includes an image forming main device to which at least one optional device is connectable, the image forming main device including (i) an image forming section, (ii) a display device, (iii) an input device, (iv) a communication device which communicates with an external device, and (v) a control section; and an information-providing external device configured to provide (i) option information indicative of the at least one optional device and (ii) eco-information indicative of an amount of greenhouse-gas which is to be emitted and/or has been emitted due to the at least one optional device, the control section being configured to (a)

obtain the option information and the eco-information from the information-providing external device via the communication device, (b) control the display device to display the option information and the eco-information, and (c) send, to the information-providing external device or another external device via the communication device, an order for an optional device selected by a user via the input device out of the at least one optional device indicated by the option information displayed on the display device.

According to the configuration, the control section of the image forming main device included in the image forming apparatus (a) obtains, from the information-providing external device via the communication device, the option information indicative of the optional devices and the eco-information indicative of the amounts of greenhouse-gases which are to be emitted and/or have been emitted due to the respective optional devices and (b) controls the display device to display the option information and the eco-information. Moreover, the control section sends, to the information-providing external device or another external device via the communication device, the order for the optional device which has been selected by the user via the input device out of the optional devices indicated by the option information displayed on the display device.

With the configuration, in a case where the user selects and orders a desired optional device by operating the input device out of optional devices displayed on the display device, the user can easily select and order an environmentally friendly optional device while checking greenhouse-gas emissions due to the optional devices displayed on the display device.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

REFERENCE SIGNS LIST

1: Image forming apparatus
2: Document reading device (optional device)
3: Image forming main device
4: Large-capacity paper feeding device (optional device)
5: Post-processing device (optional device)
11: Peripheral equipment (optional device)
12: Network
13: Management device (external device, information-providing external device)
35: Printer
111: Image transmission mode button
112: Eco-view icon
113: Order button
501: Control section
502: Storage section
503: Display section (display device)
504: Input section (input device)
505: Communication section (communication device)
507: Image forming section

The invention claimed is:

1. An image forming apparatus comprising:
an image forming main device to which at least one optional device is connectable, the image forming main device including:
an image forming section,
a display device,
an input device,
a communication device for communicating with an external device, and
a control section, the control section being configured to (a) obtain option information and eco-information from the external device via the communication device, the option information being indicative of the at least one optional device and the eco-information being indicative of an amount of greenhouse-gas which is to be emitted and/or has been emitted due to the at least one optional device, (b) control the display device to display the option information and the eco-information, and (c) send, to the external device or another external device via the communication device, an order for an optional device which has been selected by a user via the input device out of the at least one optional device indicated by the option information and the eco-information that is indicative of an amount of greenhouse-gas which is to be emitted and/or has been emitted due to the at least one optional device that is displayed on the display device.

2. The image forming apparatus as set forth in claim 1, wherein:
the eco-information displayed on the display device includes a label indicative of the eco-information.

3. The image forming apparatus as set forth in claim 1, wherein:
the eco-information includes plural kinds of eco-information which are respectively authorized by different parties.

4. The image forming apparatus as set forth in claim 1, wherein:
the control section is configured to (a) obtain product information of at least one other image forming apparatus and eco-information from the external device via the communication device, the eco-information being indicative of an amount of greenhouse-gas which is to be emitted and/or has been emitted due to the at least one other image forming apparatus, (b) control the display device to display the product information and the eco-information, and (c) send, to the external device or another external device via the communication device, an order for an image forming apparatus selected by the user via the input device out of the at least one other image forming apparatus indicated by the product information.

5. An optional device ordering system for an image forming apparatus, comprising:
an image forming apparatus which includes an image forming main device to which at least one optional device is connectable, the image forming main device including (i) an image forming section, (ii) a display device, (iii) an input device, (iv) a communication device for communicating with an external device, and (v) a control section; and
an information-providing external device configured to provide (i) option information indicative of the at least one optional device and (ii) eco-information indicative of an amount of greenhouse-gas which is to be emitted and/or has been emitted due to the at least one optional device,
the control section being configured to (a) obtain the option information and the eco-information from the information-providing external device via the communication device, (b) control the display device to display the option information and the eco-information, and (c) send, to the information-providing external device or another external device via the communication device, an order for an optional device selected by a user via the input device out of the at least one optional device indicated by the option information and the eco-information indicative of an amount of greenhouse-gas which is to be emitted and/or has been emitted due to the at least one optional device that is displayed on the display device.

6. A method for ordering an optional device for an image forming apparatus which includes an image forming main device to which at least one optional device is connectable, the image forming main device including (i) an image forming section, (ii) a display device, (iii) an input device, (iv) a communication device for communicating with an external device, and (v) a control section, said method comprising the steps of:

the control section obtaining option information and eco-information from the external device via the communication device, the option information being indicative of the at least one optional device and the eco-information being indicative of an amount of greenhouse-gas which is to be emitted and/or has been emitted due to the at least one optional device;

the control section controlling the display device to display the option information and the eco-information; and the control section sending, to the external device or another external device via the communication device, an order for an optional device which has been selected by a user via the input device out of the at least one optional device indicated by the option information and the eco-information indicative of an amount of greenhouse-gas which is to be emitted and/or has been emitted due to the at least one optional device that is displayed on the display device.

* * * * *